US012693589B2

(12) United States Patent
Lu et al.

(10) Patent No.: US 12,693,589 B2
(45) Date of Patent: Jul. 28, 2026

(54) ILLUMINATION SYSTEM AND PROJECTION APPARATUS

(71) Applicant: Coretronic Corporation, Hsin-Chu (TW)

(72) Inventors: Yi-Tien Lu, Hsin-Chu (TW); Chin-Wen Huang, Hsin-Chu (TW); Kuan-Lun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 304 days.

(21) Appl. No.: 18/393,615

(22) Filed: Dec. 21, 2023

(65) Prior Publication Data

US 2024/0219822 A1 Jul. 4, 2024

(30) Foreign Application Priority Data

Dec. 29, 2022 (CN) .......................... 202211707172.3

(51) Int. Cl.
| | |
|---|---|
| *G03B 21/14* | (2006.01) |
| *G03B 21/00* | (2006.01) |
| *G03B 21/20* | (2006.01) |

(52) U.S. Cl.
CPC ......... *G03B 21/208* (2013.01); *G03B 21/005* (2013.01); *G03B 21/204* (2013.01); *G03B 21/2066* (2013.01)

(58) Field of Classification Search
CPC .. G03B 21/208; G03B 21/005; G03B 21/204; G03B 21/2066; G03B 21/20; G02B 3/08
See application file for complete search history.

(56) References Cited

U.S. PATENT DOCUMENTS

| | | | | |
|---|---|---|---|---|
| 8,662,690 B2 * | 3/2014 | Li | ........................... | F21V 13/14 |
| | | | | 362/249.02 |
| 2012/0147334 A1 * | 6/2012 | Mizushima | .......... | H04N 9/3164 |
| | | | | 353/38 |
| 2024/0219822 A1 * | 7/2024 | Lu | ........................ | G03B 21/204 |

FOREIGN PATENT DOCUMENTS

| | | |
|---|---|---|
| CN | 106406001 | 2/2017 |
| CN | 216118360 | 3/2022 |
| CN | 114442203 | 5/2022 |
| TW | 200925766 | 6/2009 |

* cited by examiner

*Primary Examiner* — Howard D Brown, Jr.
(74) *Attorney, Agent, or Firm* — JCIPRNET

(57) ABSTRACT

An illumination system provides an illumination light beam and includes a light source device providing a first light beam, a dichroic element, a lens module, and a wavelength conversion element disposed on a transmission path of the first light beam and configured to convert the first light beam into a second light beam. The dichroic element is disposed between the light source device and the wavelength conversion element, guides the first light beam from the light source device to the wavelength conversion element, and transmits the second light beam from the wavelength conversion element. The lens module is disposed between the dichroic element and the wavelength conversion element. The lens module includes a first lens element including a first surface and a second surface opposite to each other, and at least one of the first surface and the second surface is a Fresnel structure surface.

20 Claims, 4 Drawing Sheets

ILLUMINATION SYSTEM AND PROJECTION APPARATUS

CROSS-REFERENCE TO RELATED APPLICATION

This application claims the priority benefit of China application serial no. CN,202211707172.3 filed on Dec. 29, 2022. The entirety of the above-mentioned patent application is hereby incorporated by reference herein and made a part of this specification.

BACKGROUND

Technical Field

The invention relates to an optical system and an electronic apparatus, and in particular, to an illumination system and a projection apparatus.

Description of Related Art

Projection apparatuses are display apparatuses for generating large-size images and have experienced continuous improvement with the evolution and innovation of science and technology. According to the imaging principle of a projection apparatus, an illumination light beam generated by an illumination system is converted into an image light beam via a light valve. Afterwards, the image light beam passes through a projection lens and is projected to a projection target (e.g., a screen or a wall) to form a projection image.

In addition, with the market's requirements for brightness, color saturation, service life, non-toxic and environmental protection, etc. of projection apparatuses, the illumination system has evolved from ultra-high-performance lamps (UHP lamps) to light-emitting diodes (LEDs), and to the most advanced laser diode (LD) light sources. At present, in order to meet the requirement of high brightness in the light-combining system, the output power of the light source begin to increase. However, the increase in the output power will increase the energy density of the light beam in the lens, which will lead to a thicker lens, easy accumulation of heat, and cracking of the lens due to heat.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The invention provides an illumination system and a projection apparatus in which the thickness of the lens is reduced, the effect of preventing the lens from accumulating heat easily is achieved, the problem of lens cracking due to overheating is solved, and the optical effect is further improved.

Other objects and advantages of the invention may be further illustrated by the technical features broadly embodied and described as follows.

In order to achieve one or a portion of or all of the objects or other objects, the invention provides an illumination system configured to provide an illumination light beam. The illumination system includes a light source device, a dichroic element, a lens module, and a wavelength conversion element. The light source device provides a first light beam. The wavelength conversion element is disposed on a transmission path of the first light beam and is configured to convert the first light beam into a second light beam. A wavelength of the first light beam is different from a wavelength of the second light beam. The dichroic element is disposed between the light source device and the wavelength conversion element and is configured to guide the first light beam from the light source device to the wavelength conversion element and transmit the second light beam from the wavelength conversion element. The lens module is disposed between the dichroic element and the wavelength conversion element and is configured to converge the first light beam from the dichroic element on the wavelength conversion element and transmit the second light beam from the wavelength conversion element. The lens module includes a first lens element. The first lens element includes a first surface and a second surface opposite to each other, and at least one of the first surface and the second surface is a Fresnel structure surface. The illumination light beam includes at least one of the first light beam and the second light beam.

In order to achieve one or a portion of or all of the objects or other objects, the invention further provides a projection apparatus including an illumination system, at least one light valve, and a projection lens. The illumination system is configured to provide an illumination light beam. The illumination system includes a light source device, a dichroic element, a lens module, and a wavelength conversion element. The light source device provides a first light beam. The wavelength conversion element is disposed on a transmission path of the first light beam and is configured to convert the first light beam into a second light beam. A wavelength of the first light beam is different from a wavelength of the second light beam. The dichroic element is disposed between the light source device and the wavelength conversion element and is configured to guide the first light beam from the light source device to the wavelength conversion element and transmit the second light beam from the wavelength conversion element. The lens module is disposed between the dichroic element and the wavelength conversion element and is configured to converge the first light beam from the dichroic element on the wavelength conversion element and transmit the second light beam from the wavelength conversion element. The at least one light valve is disposed on a transmission path of the illumination light beam and is configured to convert the illumination light beam into an image light beam. The projection lens is disposed on a transmission path of the image light beam and is configured to project the image light beam out of the projection apparatus. Herein, the lens module includes a first lens element. The first lens element includes a first surface and a second surface opposite to each other, and at least one of the first surface and the second surface is a Fresnel structure surface. The illumination light beam includes at least one of the first light beam and the second light beam.

To sum up, the embodiments of the invention have at least one of the following advantages or effects. In the illumination system and the projection apparatus provided by the invention, the illumination system includes the light source device, the dichroic element, the lens module, and the wavelength conversion element. The lens module includes the first lens element. Herein, the first lens element includes the first surface and the second surface opposite to each other, and at least one of the first surface and the second surface is a Fresnel structure surface. Therefore, through the use the optical lens with a Fresnel structure surface, the portion of the light beam that travels in a straight line in the glass can be removed and the curved surface that refracts the light beam is retained. In this way, the thickness of the lens is reduced, the effect of preventing the lens from accumulating heat easily is achieved, and the problem of lens cracking due to overheating is further solved. Besides, the optical effect is further improved, so that the overall light collection efficiency is increased compared to the conventional arrangement.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
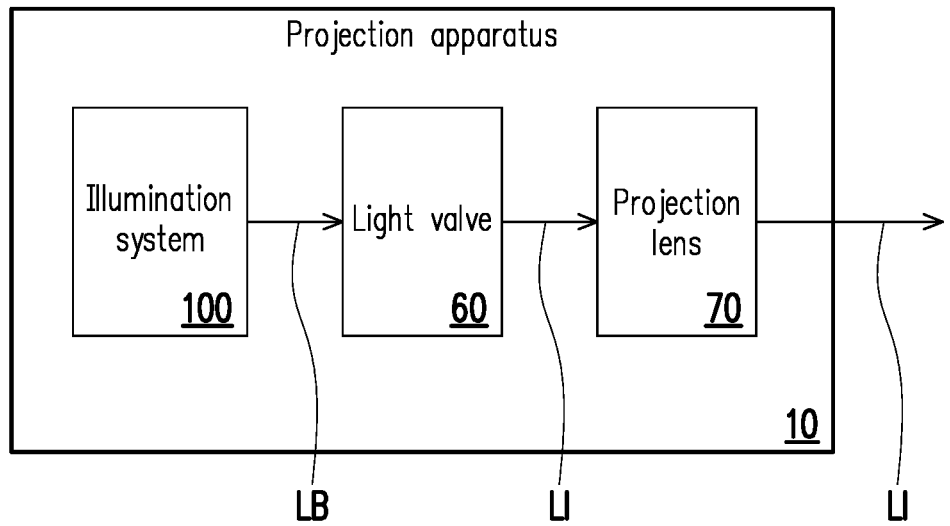
FIG. 1 is a schematic view of a projection apparatus according to an embodiment of the invention.

FIG. 1 is a schematic view of a projection apparatus according to an embodiment of the invention. With reference to FIG. 1, the embodiment provides a projection apparatus 10 including an illumination system 100, at least one light valve 60, and a projection lens 70. Herein, the illumination system 100 is configured to provide an illumination light beam LB. The at least one light valve 60 is disposed on a transmission path of the illumination light beam LB and is configured to convert the illumination light beam LB into an image light beam LI. The projection lens 70 is disposed on a transmission path of the image light beam LI and is configured to project the image light beam LI out of the projection apparatus 10 to a projection target (not shown) such as a screen or a wall.

The light valve 60 is, for example, a reflective light modulator such as a liquid crystal on silicon panel (LCoS panel) and a digital micro-mirror device (DMD). In some embodiments, the light valve 60 may also be, for example, a transmissive light modulator such as a transparent liquid crystal panel, an electro-optical modulator, a magneto-optic modulator, and an acousto-optic modulator (AOM). The form and type of the light valve 60 is not particularly limited in the invention. Detailed steps and implementation of the method for converting the illumination light beam LB into the image light beam LI by the light valve 60 may be obtained through sufficient teachings, suggestions, and other implementation description in the art, and repeated description is thus not provided herein. In this embodiment, the number of the light valve 60 is one, and the projection apparatus 10 is, for example, a projection apparatus using a single digital micro-mirror device. Nevertheless, in other embodiments, the number of the light valve may be plural, which should however not be construed as limitations to the invention.

The projection lens 70 includes, for example, one or a plurality of optical lens combinations with refracting powers including various non-planar lens combinations of a biconcave lens, a biconvex lens, a concave-convex lens, a convex-concave lens, a plane-convex lens, and a plane-concave lens, for example. In an embodiment, the projection lens 70 may further include a planar optical lens, so as to project the image light beam LI from the light valve 60 to the projection target through reflection. The form and type of the projection lens 70 is not particularly limited in the invention.

Figure 2:
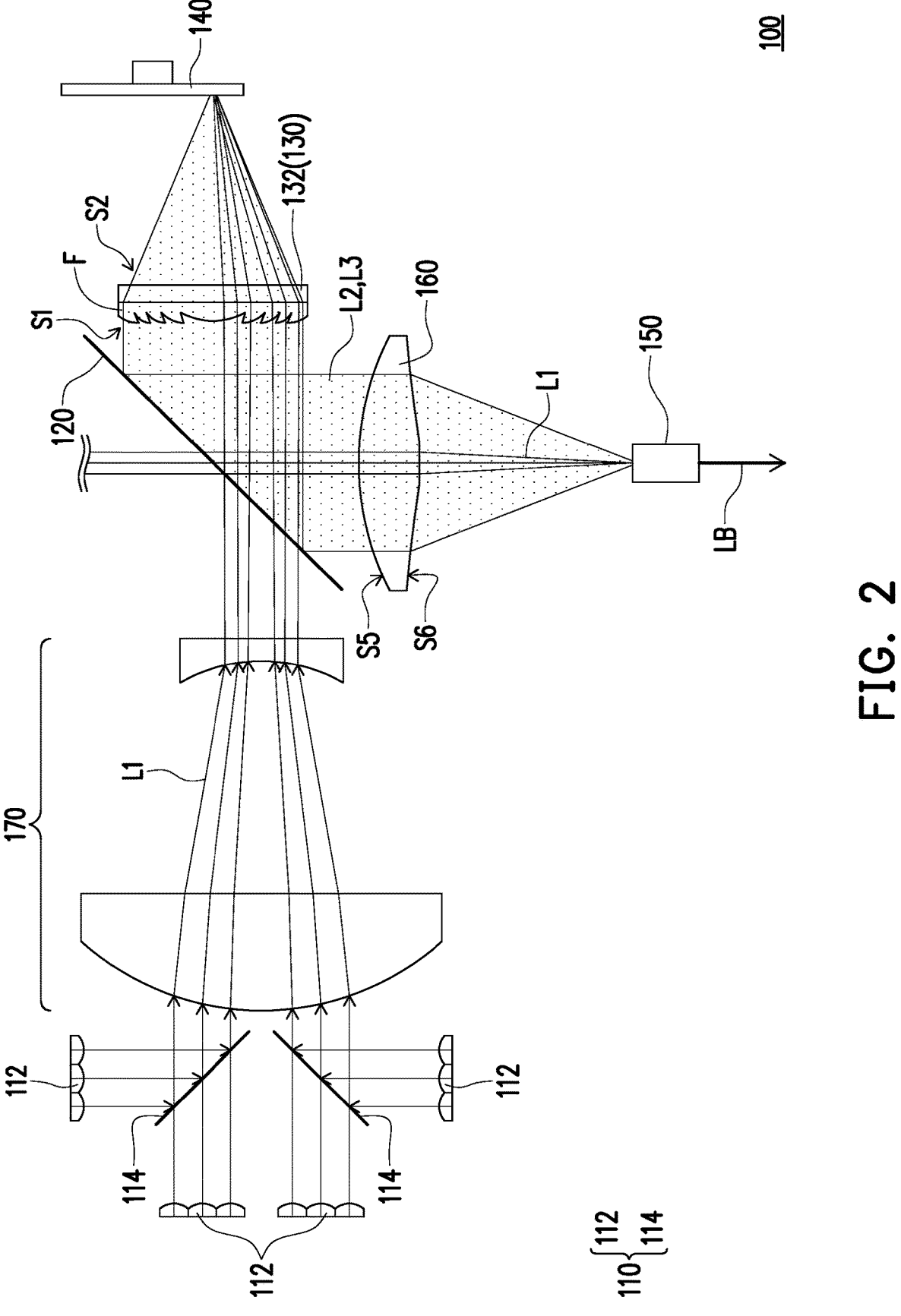
FIG. 2 is a schematic view of an illumination system according to an embodiment of the invention.

FIG. 2 is a schematic view of an illumination system according to an embodiment of the invention. The illumination system 100 shown in FIG. 2 may at least be applied to the projection apparatus 10 shown in FIG. 1. With reference to FIG. 2, the illumination system 100 is configured to provide the illumination light beam LB. In this embodiment, the illumination system 100 includes a light source device 110, a dichroic element 120, a lens module 130, and a wavelength conversion element 140. The wavelength conversion element 140 is configured to provide light of different wavelengths to form the image light beam LI.

However, except for the description in the following paragraphs of the specification, the present invention does not limit the type or form of the illumination system 100, and its detailed structure and implementation can be obtained from sufficient teachings, suggestions, and implementation descriptions based on common knowledge in the art, so repeated description thereof is not provided herein.

The light source device 110 provides a first light beam L1. For instance, in this embodiment, the light source device 110 includes a plurality of light-emitting elements 112 and a plurality of light-guiding elements 114. The plurality of light-emitting elements 112 provide the first light beam L1, and the plurality of light-emitting elements 112 are, for example, a laser light source array composed of laser diodes (LDs). In this embodiment, for example, a blue laser diode is used to provide the first blue light beam L1, which should however not be construed as limitations to the invention. The plurality of light-guiding elements 114 are configured to guide the first light beam L1 provided by the plurality of light-emitting elements 112 to be transmitted towards the dichroic element 120. Each light-guiding element 114 is, for example, a device having a part of a strip mirror and a part of a strip-shaped penetrating region or a beam splitter.

The wavelength conversion element 140 is, for example, a phosphor wheel. The wavelength conversion element 140 is disposed on a transmission path of the first light beam L1 and is configured to convert the first light beam L1 into a second light beam L2 or a third light beam L3. A wavelength of the first light beam L1 is different from a wavelength of the second light beam L2, the wavelength of the first light beam L1 is different from a wavelength of the third light beam L3, and the wavelength of the second light beam L2 is different from the wavelength of the third light beam L3. Herein, the illumination light beam LB includes at least one of the first light beam L1, the second light beam L2, and the third light beam L3. In detail, the wavelength conversion element 140 has at least one wavelength conversion material (e.g., a phosphor material) on it. The present invention does not limit the form and type of the wavelength conversion element 140, which may include any number of conversion regions and light transmission regions. Each light transmission region is, for example, a reflection region or a penetration region, and the light transmission region is configured to allow the first light beam L1 to pass through. In this embodiment, the plurality of conversion regions may individually excite the first blue light beam L1 into the second red light beam L2 and the third green light beam L3, but not limited thereto. Taking the light transmission region being a penetration region as an example, the penetration region allows the first light beam L1 to pass through to be transmitted to the rear optical element (not shown) such as a diffuser, a relay lens, or a collimator lens, and then be transmitted to the dichroic element 120. The first light beam L1 passes through the dichroic element 120. Detailed steps and implementation of the method for converting the first light beam L1 into the second light beam L2 and the third light beam L3 by the wavelength conversion element 140 may be obtained through sufficient teachings, suggestions, and other implementation description in the art, and repeated description is thus not provided herein.

The dichroic element 120 is, for example, a dichroic mirror. The dichroic element 120 is disposed between the light source device 110 and the wavelength conversion element 140 and is configured to guide the first light beam L1 from the light source device 110 to the wavelength conversion element 140 and transmit the second light beam L2 and the third light beam L3 from the wavelength conversion element 140. In other words, in this embodiment, one side (one surface) of the dichroic element 120 facing the light source device 110 is configured to allow the first light beam L1 to pass through, and the other side (the other surface) of the dichroic element 120 facing the wavelength conversion element 140 is configured to reflect the second light beam L2 and the third light beam L3. The invention does not limit the type and manufacturing method of the dichroic element 120.

In this embodiment, the illumination system 100 further includes a light-homogenizing element 150 and a focusing lens element 160. On transmission paths of the second light beam L2 and the third light beam L3, the focusing lens element 160 is disposed between the dichroic element 120 and the light-homogenizing element 150. The focusing lens element 160 is configured to converge the first light beam L1, the second light beam L2, and the third light beam L3 on the light-homogenizing element 150. Herein, the dichroic element 120 is further configured to transmit the first light beam L1 to the focusing lens element 160. For instance, in the illumination system 100, a plurality of optical elements, such as reflectors (not shown), may be arranged behind the wavelength conversion element 140 to guide the first light beam L1 to be transmitted back to the dichroic element 120, transmitted to the focusing lens element 160 through the dichroic element 120, and then converged on the light-homogenizing element 150. The light-homogenizing element 150 is configured to adjust speckle shapes of the first light beam L1, the second light beam L2, and the third light beam L3. In this way, at least one of the first light beam L1, the second light beam L2, and the third light beam L3 forms the illumination light beam LB, a speckle shape of the illumination beam LB and a shape (e.g., rectangle) of a working region of the light valve 60 may be matched, and all parts of the speckle irradiated on the light valve 60 have the same or close light intensity. In this embodiment, the light-homogenizing element 150 is, for example, an integration rod. Nevertheless, in other embodiments, the light-homogenizing element 150 may also be an optical element of another suitable form such as a lens array (fly eye lens array), which should however not be construed as limitations to the invention.

In addition, in this embodiment, the illumination system 100 further includes a light pattern adjustment module 170. On the transmission path of the first light beam L1, the light pattern adjustment module 170 is disposed between the light source device 110 and the dichroic element 120. The light pattern adjustment module 170 includes at least one of a lens array and a diffuser and is configured to adjust a light pattern of the first light beam L1. For instance, in this embodiment, the light pattern adjustment module 170 includes a collimator lens group formed by at least one optical lens, where at least one of the at least one optical lens has a diffuser (not shown), but the invention does not limit the type and manufacturing method of the diffusion interface.

Figure 3A:
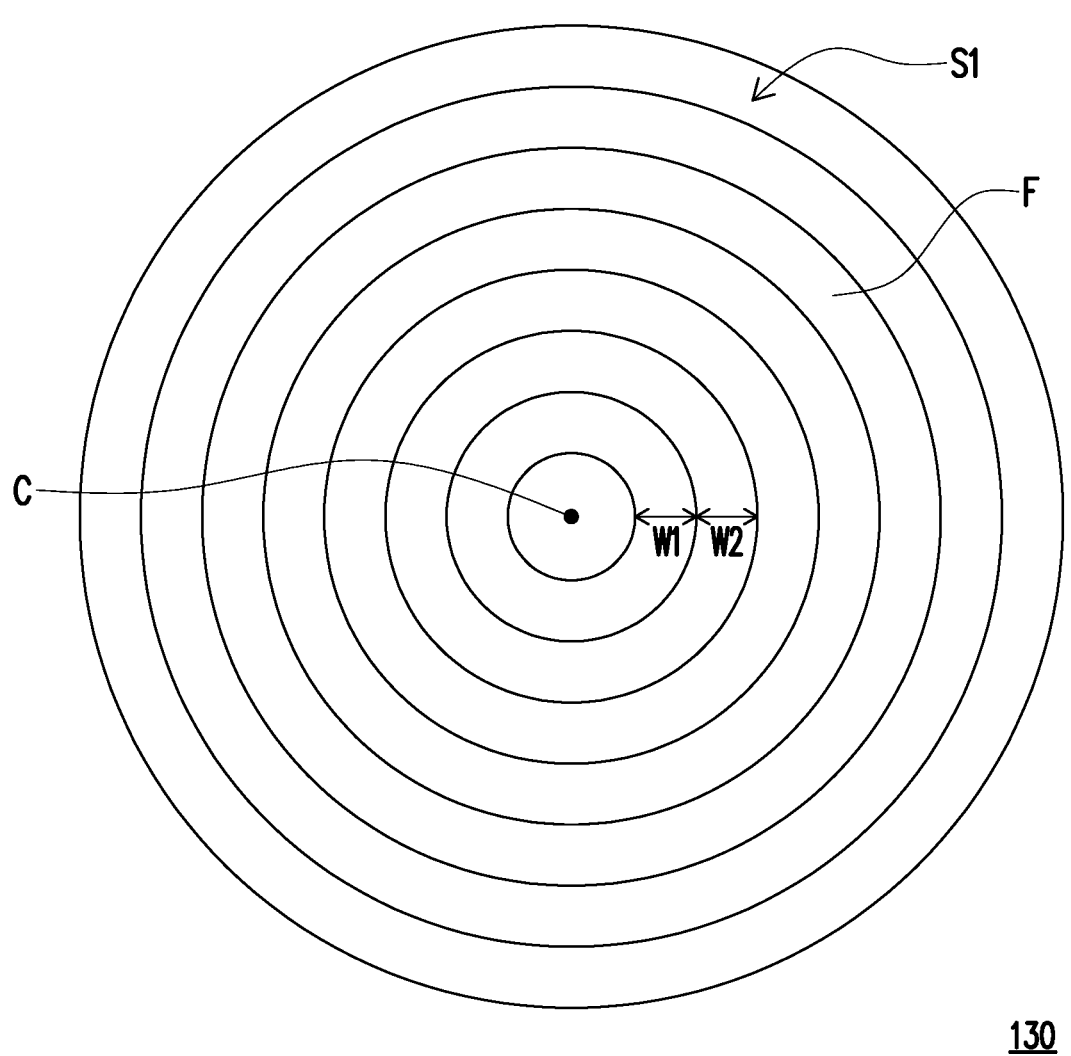
FIG. 3A and FIG. 3B respectively are a schematic top view and a schematic side view of a first lens element according to an embodiment of the invention.
Figure 3B:
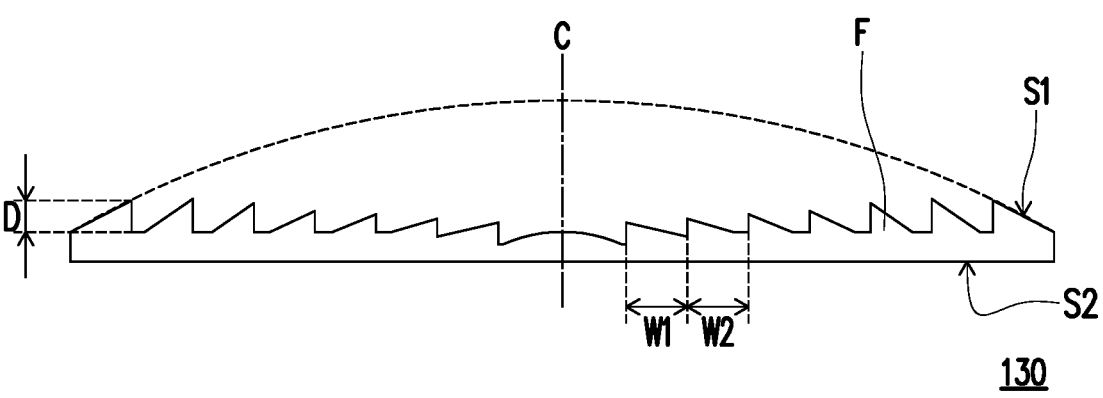

FIG. 3A and FIG. 3B respectively are a schematic top view and a schematic side view of a first lens element according to an embodiment of the invention. With reference to FIG. 2 to FIG. 3B, On the transmission path of the first light beam L1, the lens module 130 is disposed between the dichroic element 120 and the wavelength conversion element 140 and is configured to converge the first light beam L1 from the dichroic element 120 on the wavelength conversion element 140 and transmit the second light beam L2 and the third light beam L3 from the wavelength conversion element 140. A distance from the lens module 130 to the wavelength conversion element 140 is greater than or equal to 1 mm and less than or equal to 20 mm. The lens module 130 includes a first lens element 132, and the first lens element 132 includes a first surface S1 and a second surface S2 opposite to each other. Therefore, the distance from the lens module 130 to the wavelength conversion element 140 can be defined by a distance on an optical axis between the first surface S1 of the lens module 130 and a surface of the wavelength conversion element 140 facing the lens module 130.

Figure 4:
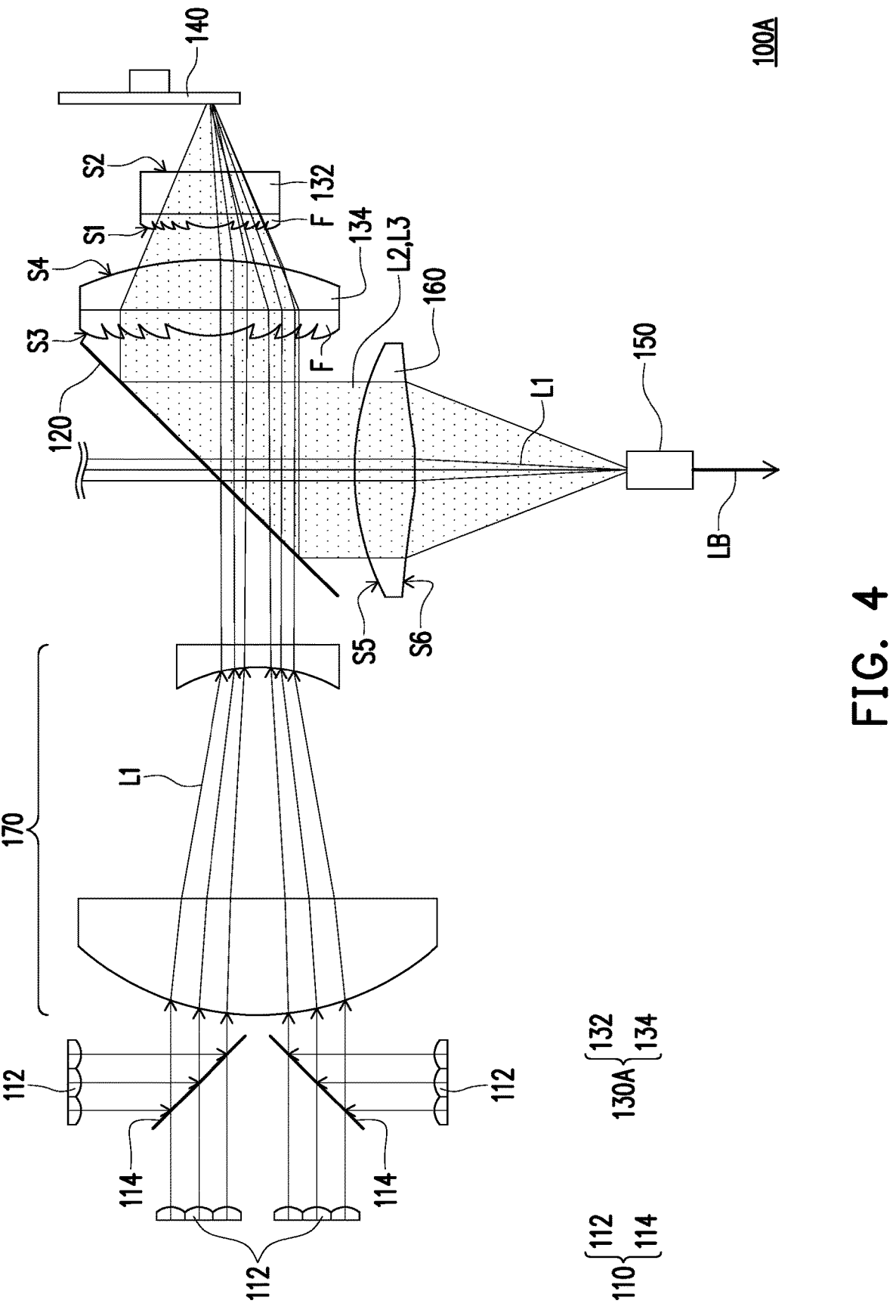
FIG. 4 is a schematic view of an illumination system according to another embodiment of the invention.

At least one of the first surface S1 and the second surface S2 is a Fresnel structure surface. At least the other one of the first surface S1 and the second surface S2 of the first lens element 132 is a flat surface, a concave surface, or a convex surface, and may also be a Fresnel structure surface, which should however not be construed as limitations to the invention. In other words, the first lens element 132 is a Fresnel lens. In detail, the Fresnel structure surface includes a plurality of annular sawtooth structures F concentrically arranged. In this embodiment, a radial width W1 or W2 of one of the annular sawtooth structures F perpendicular to a central axis C of the Fresnel structure surface is greater than or equal to 0.02 mm and less than or equal to 8 mm. Further, a depth D of the plurality of annular sawtooth structures F parallel to the central axis C of the Fresnel structure surface is greater than or equal to 0.02 mm and less than or equal to 0.5 mm. Herein, the central axis C may be defined by an optical axis of the first lens element 132. With the limitation of the abovementioned optical parameters, favorable optical effects can be obtained. In this embodiment, the first surface S1 of the first lens element 132 is a Fresnel structure surface, and the second surface S2 is a flat surface. In this way, through the use of the optical lens with a Fresnel structure surface, the portion of the light beam that travels in a straight line in the glass can be removed and the curved surface that refracts the light beam is retained. Therefore, the thickness of the lens may be reduced, the effect of preventing the lens FIG. 4 is a schematic view of an illumination system according to another embodiment of the invention. With reference to FIG. 4, an illumination system 100A provided by this embodiment is similar to the illumination system 100 shown in FIG. 2. The difference therebetween is that in this embodiment, a lens module 130A further includes a second lens element 134 located between the first lens element 132 and the wavelength conversion element 140, and an effective focal length of the second lens element 134 is greater than an effective focal length of the first lens element 132. To be specific, similar to the first lens element 132, the second lens element 134 includes a third surface S3 and a fourth surface S4 opposite to each other. At least one of the third surface S3 and the fourth surface S4 is a Fresnel structure surface. At least the other one of the third surface S3 and the fourth surface S4 is a flat surface, a concave surface, or a convex surface, and may also be a Fresnel structure surface, which should however not be construed as limitations to the invention.

In this embodiment, the third surface S3 of the second lens element 134 is a Fresnel structure surface, and the fourth surface S4 is a flat surface. With reference to FIG. 3B together, for instance, in this embodiment, the depth D of the first lens element 132 parallel to the central axis C of the Fresnel structure surface is, for example, 0.25 mm, the radial width W1 closest to the central axis C is, for example, 1.63 mm, and the radial width W2 next closest to the central axis C is, for example, 1.14 mm. The depth D of the second lens element 134 parallel to the central axis C of the Fresnel structure surface is, for example, 0.20 mm, the radial width W1 closest to the central axis C is, for example, 1.20 mm, and the radial width W2 next closest to the central axis C is, for example, 0.96 mm. Therefore, the optical data of the optical lens adopting the conventional optical lens and the optical data of the optical lens adopting the Fresnel structure surface can be presented in Table (1) and Table (2) as follows:

TABLE (1)

| Conventional | Curvature R1 | Curvature R2 | Thickness (mm) | First surface focal length (mm) | Equivalent focal length (mm) |
|---|---|---|---|---|---|
| First lens element (spherical lens) | 20.00 | 155.00 | 17.0 | 25.370 | 27.597 |
| Second lens element (aspheric lens) | 29.35 | 876.54 | 20.0 | 40.403 | 41.391 |

TABLE (2)

| Present invention | Curvature R1 | Curvature R2 | Thickness (mm) | First surface focal length (mm) | Equivalent focal length (mm) |
|---|---|---|---|---|---|
| First lens element (Fresnel lens) | 9.55 | 120.00 | 9.0 | 12.114 | 12.705 |
| Second lens element (Fresnel lens) | 20.54 | −83.24 | 12.0 | 41.274 | 34.429 | from accumulating heat easily may also be achieved, and the problem of lens cracking due to overheating is further solved. Besides, through the arrangement provided in this embodiment, the optical effect can be further improved, so that the overall light collection efficiency of the light-homogenizing element 150 is increased by 1.7% compared to the conventional arrangement.

The curvature R1 is represented as the curvature of the first surface S1 in the first lens element 132 and the curvature of the third surface S3 in the second lens element 134. The curvature R2 is represented as the curvature of the second surface S2 in the first lens element 132 and the curvature of the fourth surface S4 in the second lens element 134. As can be seen from the comparison of the optical data shown in the above Table (1), in the optical structure using the optical lens with the Fresnel structure surface, compared to the conventional optical structure, the thickness of the first lens element 132 is reduced from 17 mm to 9 mm, and the equivalent focal length of the first lens element 132 is reduced from 27.597 to 12.705. Further, the thickness of the second lens element 134 is reduced from 20 mm to 12 mm, and the equivalent focal length of the second lens element 134 is reduced from 41.391 to 34.429. In this way, the thickness of the lens is reduced, the effect of preventing the lens from accumulating heat easily is achieved, and the problem of lens cracking due to overheating is further solved. Besides, through the arrangement provided in this embodiment, the optical effect can be further improved, so that the overall light collection efficiency of the light-homogenizing element 150 is increased by 3.98% compared to the conventional arrangement.

In another embodiment, the focusing lens element 160 includes a fifth surface S5 and a sixth surface S6 opposite to each other. At least one of the fifth surface S5 and the sixth surface S6 is a Fresnel structure surface. At least the other one of the fifth surface S5 and the sixth surface S6 is a flat surface, a concave surface, or a convex surface, and may also be a Fresnel structure surface, which should however not be construed as limitations to the invention. That is, the focusing lens element 160 may also be configured with a Fresnel lens instead of a general optical lens.

In view of the foregoing, in the illumination system and the projection apparatus provided by the invention, the illumination system includes the light source device, the dichroic element, the lens module, and the wavelength conversion element. The lens module includes the first lens element, and the first lens element includes the first surface and the second surface opposite to each other. At least one of the first surface and the second surface is a Fresnel structure surface. Therefore, through the use the optical lens with a Fresnel structure surface, the portion of the light beam that travels in a straight line in the glass can be removed and the curved surface that refracts the light beam is retained. In this way, the thickness of the lens is reduced, the effect of preventing the lens from accumulating heat easily is achieved, and the problem of lens cracking due to overheating is further solved. Besides, the optical effect is further improved, so that the overall light collection efficiency is increased compared to the conventional arrangement.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam and comprising a light source device, a dichroic element, a lens module, and a wavelength conversion element, wherein the light source device provides a first light beam, the wavelength conversion element is disposed on a transmission path of the first light beam and is configured to convert the first light beam into a second light beam, and a wavelength of the first light beam is different from a wavelength of the second light beam, the dichroic element is disposed between the light source device and the wavelength conversion element, the first light beam from the light source device is incident on the dichroic element from one side of the dichroic element and passes through the dichroic element, and the second light beam from the wavelength conversion element is incident on the dichroic element from the other side of the dichroic element and is reflected by the dichroic element, and the lens module is disposed between the dichroic element and the wavelength conversion element and is configured to converge the first light beam from the dichroic element on the wavelength conversion element and transmit the second light beam from the wavelength conversion element to the dichroic element, the lens module comprises a first lens element, the first lens element comprises a first surface and a second surface opposite to each other, and at least one of the first surface and the second surface is a Fresnel structure surface, wherein the illumination light beam comprises at least one of the first light beam and the second light beam.

2. The illumination system according to claim 1, wherein the Fresnel structure surface comprises a plurality of annular sawtooth structures concentrically arranged, a radial width of one of the annular sawtooth structures perpendicular to a central axis of the Fresnel structure surface is greater than or equal to 0.02 mm and less than or equal to 8 mm, and a depth of the plurality of annular sawtooth structures parallel to the central axis of the Fresnel structure surface is greater than or equal to 0.02 mm and less than or equal to 0.5 mm.

3. The illumination system according to claim 1, wherein at least the other one of the first surface and the second surface of the first lens element is a flat surface, a concave surface, or a convex surface.

4. The illumination system according to claim 1, wherein a distance from the lens module to the wavelength conversion element is greater than or equal to 1 mm and less than or equal to 20 mm.

5. An illumination system, configured to provide an illumination light beam and comprising a light source device, a dichroic element, a lens module, and a wavelength conversion element, wherein the light source device provides a first light beam, the wavelength conversion element is disposed on a transmission path of the first light beam and is configured to convert the first light beam into a second light beam, and a wavelength of the first light beam is different from a wavelength of the second light beam, the dichroic element is disposed between the light source device and the wavelength conversion element and is configured to guide the first light beam from the light source device to the wavelength conversion element and the second light beam from the wavelength conversion element, and the lens module is disposed between the dichroic element and the wavelength conversion element and is configured to converge the first light beam from the dichroic element on the wavelength conversion element and transmit the second light beam from the wavelength conversion element, the lens module comprises a first lens element, the first lens element comprises a first surface and a second surface opposite to each other, and at least one of the first surface and the second surface is a Fresnel structure surface, wherein the illumination light beam comprises at least one of the first light beam and the second light beam, wherein the lens module further comprises a second lens element, and the second lens element comprises a third surface and a fourth surface opposite to each other, wherein the second lens element is located between the first lens element and the wavelength conversion element, and an effective focal length of the second lens element is greater than an effective focal length of the first lens element.

6. The illumination system according to claim 5, wherein at least one of the third surface and the fourth surface of the second lens element is a Fresnel structure surface.

7. The illumination system according to claim 6, wherein at least the other one of the third surface and the fourth surface of the second lens element is a flat surface, a concave surface, or a convex surface.

8. An illumination system, configured to provide an illumination light beam and comprising a light source device, a dichroic element, a lens module, and a wavelength conversion element, wherein the light source device provides a first light beam, the wavelength conversion element is disposed on a transmission path of the first light beam and is configured to convert the first light beam into a second light beam, and a wavelength of the first light beam is different from a wavelength of the second light beam, the dichroic element is disposed between the light source device and the wavelength conversion element and is configured to guide the first light beam from the light source device to the wavelength conversion element and the second light beam from the wavelength conversion element, and the lens module is disposed between the dichroic element and the wavelength conversion element and is configured to converge the first light beam from the dichroic element on the wavelength conversion element and transmit the second light beam from the wavelength conversion element, the lens module comprises a first lens element, the first lens element comprises a first surface and a second surface opposite to each other, and at least one of the first surface and the second surface is a Fresnel structure surface, wherein the illumination light beam comprises at least one of the first light beam and the second light beam, wherein the illumination system further comprising a light-homogenizing element and a focusing lens element, wherein the focusing lens element is disposed between the dichroic element and the light-homogenizing element, the focusing lens element comprises a fifth surface and a sixth surface opposite to each other, and at least one of the fifth surface and the sixth surface is a Fresnel structure surface.

9. The illumination system according to claim 8, wherein at least the other one of the fifth surface and the sixth surface of the focusing lens element is a flat surface, a concave surface, or a convex surface.

10. The illumination system according to claim 1, further comprising: a light pattern adjustment module disposed between the light source device and the dichroic element, wherein the light pattern adjustment module comprises at least one of a lens array and a diffuser.

11. A projection apparatus, comprising an illumination system, at least one light valve, and a projection lens, wherein the illumination system is configured to provide an illumination light beam and comprises a light source device, a dichroic element, a lens module, and a wavelength conversion element, wherein the light source device provides a first light beam, the wavelength conversion element is disposed on a transmission path of the first light beam and is configured to convert the first light beam into a second light beam, and a wavelength of the first light beam is different from a wavelength of the second light beam, the dichroic element is disposed between the light source device and the wavelength conversion element, the first light beam from the light source device is incident on the dichroic element from one side of the dichroic element and passes through the dichroic element, and the second light beam from the wavelength conversion element is incident on the dichroic element from the other side of the dichroic element and is reflected by the dichroic element, and the lens module is disposed between the dichroic element and the wavelength conversion element and is configured to converge the first light beam from the dichroic element on the wavelength conversion element and transmit the second light beam from the wavelength conversion element to the dichroic element, the at least one light valve is disposed on the transmission path of the illumination light beam and is configured to convert the illumination light beam into an image light beam, and the projection lens is disposed on a transmission path of the image light beam and is configured to project the image light beam out of the projection apparatus, wherein the lens module comprises a first lens element, the first lens element comprises a first surface and a second surface opposite to each other, at least one of the first surface and the second surface is a Fresnel structure surface, and the illumination light beam comprises at least one of the first light beam and the second light beam.

12. The projection apparatus according to claim 11, wherein the Fresnel structure surface comprises a plurality of annular sawtooth structures concentrically arranged, a radial width of one of the annular sawtooth structures perpendicular to a central axis of the Fresnel structure surface is greater than or equal to 0.02 mm and less than or equal to 8 mm, and a depth of the plurality of annular sawtooth structures parallel to the central axis of the Fresnel structure surface is greater than or equal to 0.02 mm and less than or equal to 0.5 mm.

13. The projection apparatus according to claim 11, wherein at least the other one of the first surface and the second surface of the first lens element is a flat surface, a concave surface, or a convex surface.

14. The projection apparatus according to claim 11, wherein a distance from the lens module to the wavelength conversion element is greater than or equal to 1 mm and less than or equal to 20 mm.

15. The projection apparatus according to claim 11, wherein the lens module further comprises a second lens element, and the second lens element comprises a third surface and a fourth surface opposite to each other, wherein the second lens element is located between the first lens element and the wavelength conversion element, and an effective focal length of the second lens element is greater than an effective focal length of the first lens element.

16. The projection apparatus according to claim 15, wherein at least one of the third surface and the fourth surface of the second lens element is a Fresnel structure surface.

17. The projection apparatus according to claim 16, wherein at least the other one of the third surface and the fourth surface of the second lens element is a flat surface, a concave surface, or a convex surface.

18. The projection apparatus according to claim 11, wherein the illumination system further comprises a light-homogenizing element and a focusing lens element, wherein the focusing lens element is disposed between the dichroic element and the light-homogenizing element, the focusing lens element comprises a fifth surface and a sixth surface opposite to each other, and at least one of the fifth surface and the sixth surface is a Fresnel structure surface.

19. The projection apparatus according to claim 18, wherein at least the other one of the fifth surface and the sixth surface of the focusing lens element is a flat surface, a concave surface, or a convex surface.

20. The projection apparatus according to claim 11, further comprising: a light pattern adjustment module disposed between the light source device and the dichroic element, wherein the light pattern adjustment module comprises at least one of a lens array and a diffuser.

* * * * *